UNITED STATES PATENT OFFICE.

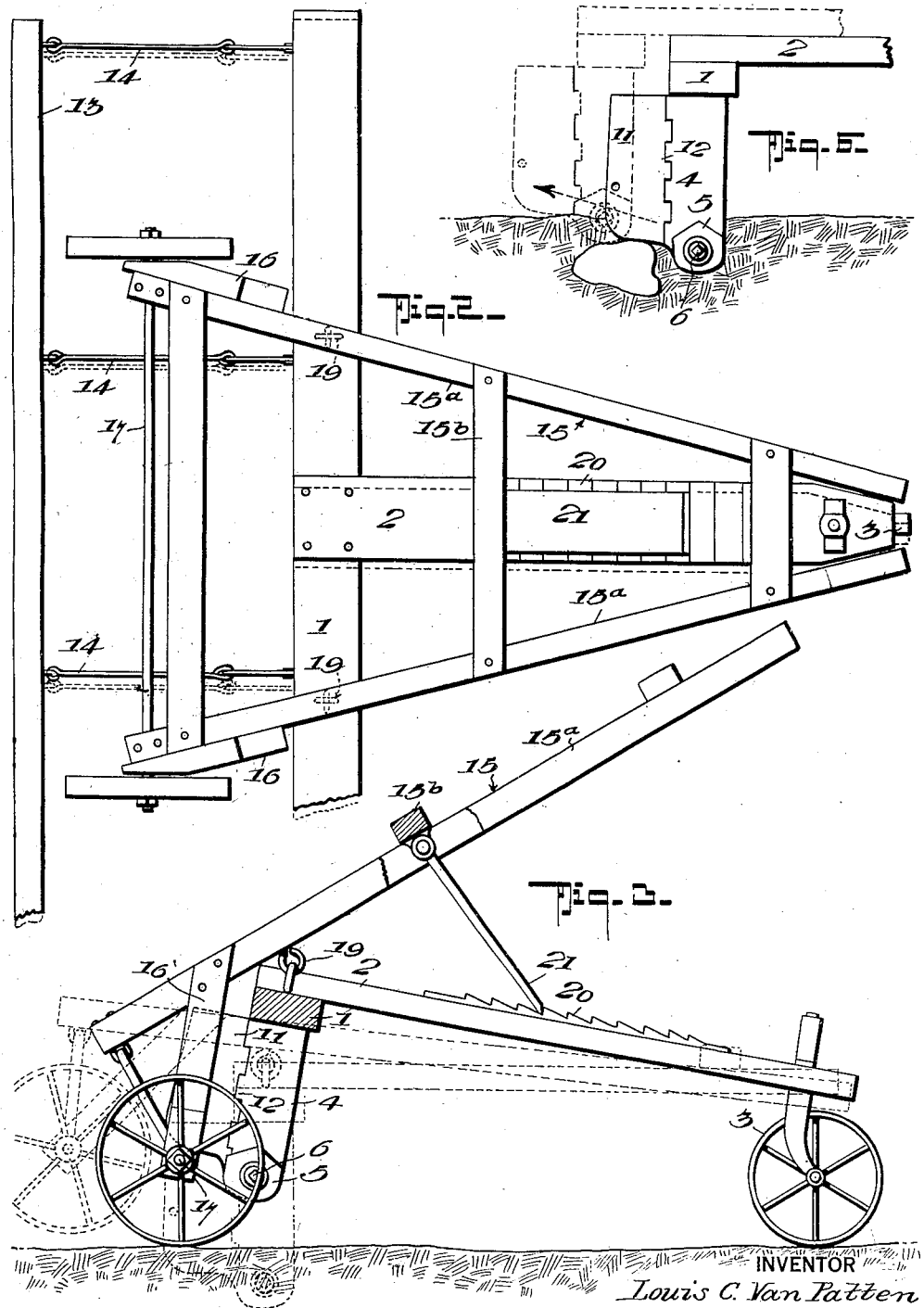

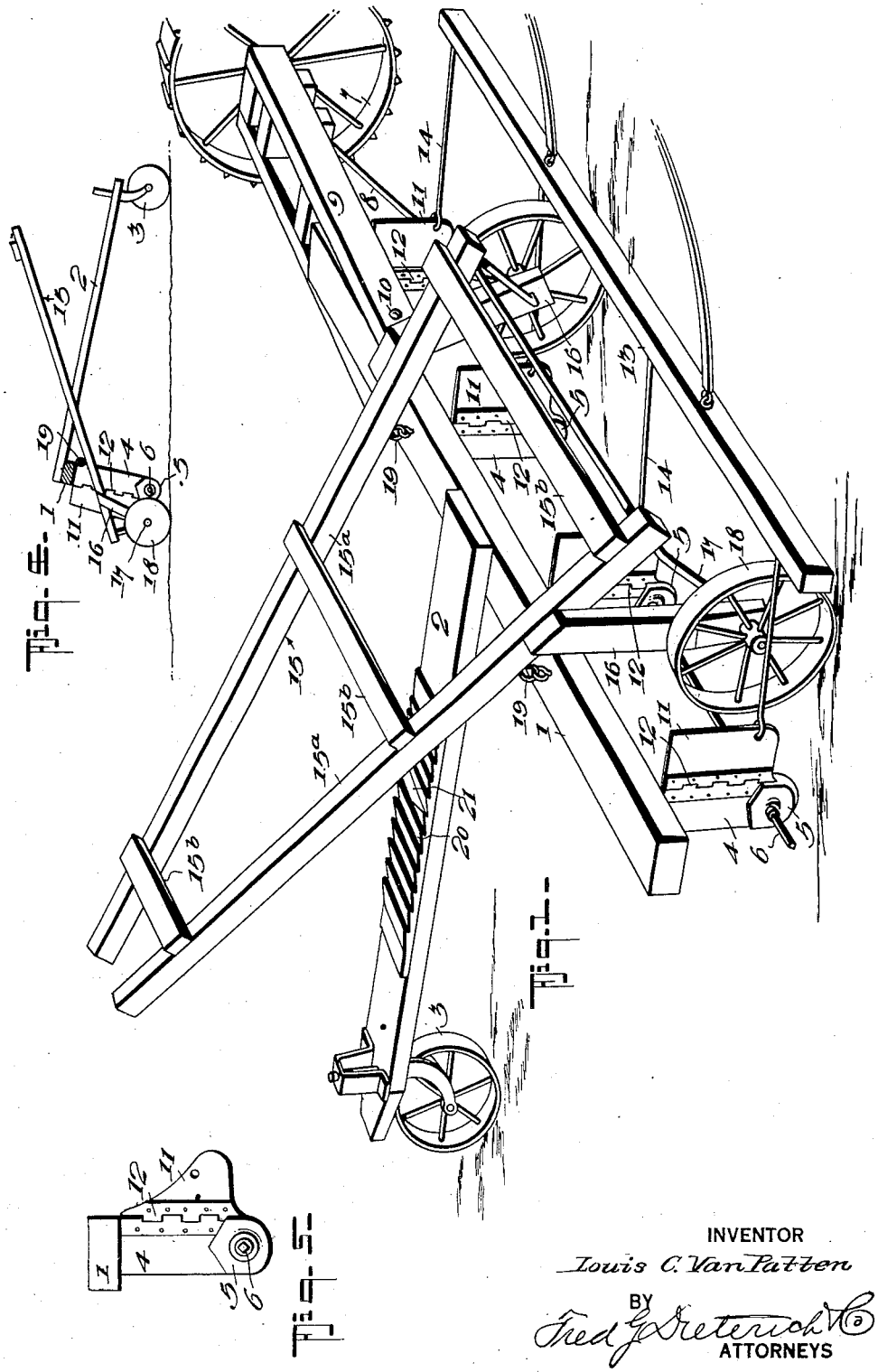

LOUIS C. VAN PATTEN, OF CHENEY, WASHINGTON, ASSIGNOR TO ROTARY ROD WEEDER AND MANUFACTURING COMPANY, INCORPORATED, OF CHENEY, WASHINGTON.

ROTARY-ROD WEEDER.

1,338,201.

Specification of Letters Patent.   Patented Apr. 27, 1920.

Application filed October 25, 1919. Serial No. 333,394.

*To all whom it may concern:*

Be it known that I, LOUIS C. VAN PATTEN, a citizen of the United States, residing at Cheney, in the county of Spokane and State of Washington, have invented certain new and useful Improvements in Rotary-Rod Weeders, (Case F,) of which the following is a specification.

My invention, which relates to the art of agricultural machinery and especially to machines for use in operations on the soil for the purpose of destroying weeds and undergrowth to leave the soil in better condition for planting, etc., has for its objects to provide a light, inexpensive, effective machine of the general type disclosed in the patent to G. H. Wolfe, No. 1,232,149, issued July 3, 1917, for the purposes stated, in which means are provided for easily raising the rotary-rod out of the ground when it is desired to clear the same or when the machine is to be transported from place to place; to provide a structure which will clear obstructions underground with least danger of breakage; to provide a machine of such construction that the tangled weeds, in advance of the rotary-rod will not be mashed down into the soil and the weeds will not become entangled with the rod carrying standards which project above the ground, or offer material resistance to the movement forward, of the machine; to provide a machine with weed separating shoes which will not only prevent the weeds being mashed down in the soil and will not only prevent the tangling of the weeds on the rotary-rod carrying standards, but will also permit the lateral or angular pull strains from the hitch bar, to be imposed on the machine in turning about, without bending or damaging the shoes, the construction being such that the shoes will also give laterally in passing fixed obstructions if necessary.

Another object of the invention is to provide a weeder of the type mentioned having the rotary rod carrying beam and tiller and the rod raising mechanism so connected as to provide a flexible or loose attachment whereby the beam may be raised up and allowed to yield laterally when passing over fixed obstructions in the ground, thus reducing the danger of breakage to the minimum.

In its general construction my new rotary-rod weeder comprises the usual cross beam which sustains the rotary rod and its driving mechanism, the rod being journaled in suitable bearings at the lower extremities of vertical supports to which the weed separating shoes (constituting a part of my present invention) are secured in advance of the rod and to which shoes the hitch bar is connected; a tiller is connected to the cross beam and includes a rearwardly projecting beam having a caster wheel near its extremity; a lifter or jack-frame lies over the cross beams and includes forwardly and downwardly projecting arms having ground wheels at the end, and includes also a lever positioned to extend over the tiller, the lifter being pivotally connected to the cross beam, preferably by loose hinge connections.

In its more detailed nature the invention also resides in those novel details of construction, combination and arrangement of parts, all of which will be first fully described, then be specifically pointed out in the appended claims and illustrated in the accompanying drawings, in which:—

Figure 1 is a perspective view of the invention showing the position of the parts when the rotary-rod is raised out of the ground.

Fig. 2 is a top plan view of the invention, parts being broken away.

Fig. 3 is a side elevation of the parts shown in Fig. 2.

Fig. 4 is a detail vertical longitudinal section, largely diagrammatic, illustrating a modification of the invention.

Fig. 5 is a detail view of a modification of the shoe structure.

Fig. 6 is a diagrammatic view illustrating a part of the operation of the machine.

In the drawing, in which like numerals or letters of reference indicate like parts in all of the figures, 1 represents the transverse beam to which the tiller beam 2 is connected, a caster wheel 3 being located at the rear of the tiller beam. The transverse beam carries the usual standards 4 that support the bearings 5 for the rotary-rod 6 and the rotary-rod 6 is driven by a traction wheel 7 and the usual power transmitting connection 8, the traction wheel 7 being mounted on an extension frame 9 which is pivoted to the beam 1 at 10 in the usual way. So far as described, the construction of the parts may be of the general nature of the corresponding parts referred to in the aforesaid Letters Patent.

The present invention, however, provides a penetrating shoe 11 for each of the standards 4, the shoe 11 being preferably hingedly connected as at 12 to the standards 4, although the shoes may be rigidly connected, if desired. The hitch bar 13 is connected by the horizontal links 14 with the shoes 11 so that draft may be applied to the vehicle.

15 designates a lever which, in the embodiment illustrated in Figs. 1, 2 and 3, may consist of a frame composed of longitudinal beams 15ᵃ—15ᵃ suitably braced together by cross connections 15ᵇ, the beams 15ᵃ being provided with standards 16 which support the shaft 17 for the ground wheels. The lever 15 is preferably connected with the beam 1 through a loose hinge connection 19 which will allow a certain amount of rise and fall play between the beam 1 and lever 15 and a certain amount of lateral movement between these parts so that as the apparatus is being drawn through the field in working order should the rod 6, standards 4 or shoes 11 engage fixed obstructions they can ride over the same or move laterally to one side to clear the same without the necessity of raising the added weight, due to the lever 15 and the ground wheels 18.

In operation, when the parts are in the position shown in dotted lines in Fig. 3, the rotary-rod will be projected beneath the surface of the ground, to the desired depth for operating purposes, at which time the lever 15 will lie in a substantially horizontal plane over the tiller beam 2 but when it is desired to raise the rotary-rod out of the ground the operator, standing on the rear end of the tiller beam 2, raises the lever 15 to the position shown in Fig. 1 and in full lines in Fig. 3, thereby lifting the rotary-rod out of the ground, as indicated.

Any suitable means may be provided for holding the lever 15 in its elevated position and for purposes of illustration, I have indicated a ratchet 20 and pawl 21 for the purpose, although it is obvious that any other suitable mechanism may be employed.

Instead of the lever 15 over-lying the beam 1 it may be arranged to lie under the same, as shown in Fig. 4, and when that construction is used the tiller 2 may be composed of a bifurcated member between the bifurcations of which the rearwardly projecting portion of the lever 15 may pass to facilitate raising the lever when it is desired to lift the rotary-rod out of the ground.

By providing the shoes 11 I find, from practical experience, that the weeds, undergrowth and soil in advance of the rotary-rod are readily parted or separated to permit a free passage of the standards 4 and bearings 5 and the undergrowth and weed entanglements are spread apart or separated by the shoes 11 so that the weeds will not hang on the standards 4 and act as drags to retard the progress of the machine or as obstructions to prevent the free forward movement thereof. Instead of making the shoes 11 with a vertical penetrating edge they may be provided with a rearwardly and upwardly curved edge to assist in the penetration of the entanglement. This design of the shoe is indicated in detail in Fig. 5. Thus, it will be seen, that by the use of my invention a machine of the general type disclosed in the aforesaid Letters Patent is provided which will be more effective in its operation and in which the provision for raising the rod out of the ground makes it unnecessary for the attendant to lift the tiller of the machine, the latter being allowed to remain, in this case, on the ground.

While I have illustrated several specific embodiments of the invention, I desire it understood that other modifications and changes in the details of construction and arrangement of parts may be readily made by those skilled in the art to which the invention appertains and I do not wish to be understood as limiting myself to the details of construction shown.

From the foregoing description, taken in connection with the accompanying drawings, it is thought the complete construction, operation and advantages of my invention will be readily understood by those skilled in the art.

What I claim is:

1. In rotary-rod weeders, the combination with the beam that carries the rotary-rod, and a tiller connected to said beam; a lever, ground wheels carried by said lever, and means pendently supporting said beam from said lever.

2. In rotary-rod weeders, the combination with the beam that carries the rotary-rod, and a tiller connected to said beam; a lever, ground wheels carried by said lever, means pendently supporting said beam from said lever, said means comprising loose hinge elements between the beam and lever.

3. In rotary-rod weeders, a beam, rotary-rod supports projecting from said beam, a rotary-rod mounted in bearings in said supports, a tiller connected to said beam, a lever over-lying said beam and projecting down in front of the beam with provisions for engaging the ground and connections between said lever and the beam.

4. In rotary-rod weeders, a beam, rotary-rod supports projecting from said beam, a rotary-rod mounted in bearings in said supports, a tiller connected to said beam, a lever overlying said beam and projecting down in front of the beam with provisions for engaging the ground and loose connections between said lever and beam.

5. In rotary-rod weeders, the combination with the beam which carries the rotary-rod bearings and their supports, a rotary-rod carried thereby, and the tiller connected with said beam; a lever member having its forward extremity projected in front of said beam and provided with means to engage the ground as a fulcrum, said lever member projecting to the rear of said beam, means connecting said lever member with said beam whereby as said lever member is raised said beam will be lifted to bring the rotary-rod out of the ground.

6. In rotary-rod weeders, the combination with the beam which carries the rotary-rod bearings and their supports, a rotary-rod carried thereby, and the tiller connected with said beam; a lever member having its forward extremity projected in front of said beam and provided with means to engage the ground as a fulcrum, said lever member projecting to the rear of said beam, and means for holding said lever member to sustain said beam and rod in the elevated position.

7. In rotary-rod weeders, the combination with the beam which carries the rotary-rod bearings and their supports, a rotary-rod carried thereby, and the tiller connected with said beam; a lever member having its forward extremity projected in front of said beam and provided with means to engage the ground as a fulcrum, said lever member projecting to the rear of said beam, means loosely connecting said lever member with said beam whereby as said lever member is raised said beam will be lifted to bring the rotary-rod out of the ground.

8. In rotary-rod weeders, the combination with the beam that carries the rotary-rod and its supports, and a tiller connected to said beam; a lever, ground wheels carried by said lever, means pendently supporting said beam from said lever, and means for holding said lever to sustain said beam and rod in the elevated position.

9. In rotary-rod weeders, a beam, rotary-rod supports projecting from said beam, a rotary-rod mounted in bearings in said supports, a tiller connected to said beam, a lever over-lying said beam and projecting down in front of the beam with provisions for engaging the ground and connections between said lever and the beam, and means for holding said lever to sustain said beam and rod in the elevated position.

10. In rotary-rod weeders, a beam, rod bearing supports carried by said beam, a rotary-rod journaled in bearings at the lower extremities of said supports, and weed separating shoes connected to said supports and extending in front of the supports.

11. In rotary-rod weeders, a beam, rod bearing supports carried by said beam, a rotary-rod journaled in bearings at the lower extremities of said supports, weed separating shoes connected said supports and extending in front of the same, said shoes when the weeder is in operation, adapted to lie both above and below the ground in vertical planes.

12. In rotary-rod weeders, the combination with the standard which carries the rod bearing, of weed separating shoes movably secured to said standard in advance of the rotary-rod.

13. In rotary-rod weeders of the type employing a transverse beam, a tiller connected to said beam and supporting standards carried by the beam for the rotatable rod and its bearings, the combination with the standards and the rotatable rod, of means adapted to engage the weeds in advance of the rod and directly in front of the standards to separate the same.

14. In rotary-rod weeders of the type employing a transverse beam, a tiller connected to said beam, rod supporting standards carried by the beam and a rotatable rod journaled in bearings at the lower ends of said standards; the combination with the standards, of weed separating shoes carried by the standards and projecting forwardly therefrom, said shoes adapted to extend above and below the ground to engage the weeds in advance of the engagement of the same by the rotary-rod.

15. In rotary-rod weeders of the type employing a transverse beam, a tiller connected to said beam, rod supporting standards carried by the beam and a rotatable rod journaled in bearings at the lower ends of said standards, the combination with the standards, of weed separating shoes hingedly connected with said standards and projected in front of the same to engage and separate the weeds before the weeds are up-rooted by the rotary-rod.

16. In rotary-rod weeders, a beam, rod bearing supports rigidly carried by said beam, rod bearings carried by each of said supports, a rotary-rod journaled in said bearings, weed separating shoes projected in advance of said rod bearing supports and extending above and below the ground in vertical planes, said shoes having means for riding over obstructions to raise the rod to clear the same.

17. In rotary-rod weeders, a beam, rod bearing supports rigidly carried by said beam, rod bearings carried by each of said supports, a rotary-rod journaled in said bearings, weed separating shoes projected in advance of said rod bearing supports and extending above and below the ground in vertical planes, said shoes having means for riding over obstructions to raise the rod to clear the same, said shoes being hingedly connected to said rod-bearing supports, and a draft appliance connected to said shoes.

LOUIS C. VAN PATTEN.